(12) United States Patent
Huber

(10) Patent No.: US 11,317,281 B2
(45) Date of Patent: Apr. 26, 2022

(54) METHOD AND A NETWORK DEVICE FOR PROVIDING SERVICES TO USER DEVICES IN A WIRELESS NETWORK

(71) Applicant: Telia Company AB, Solna (SE)

(72) Inventor: Michael Huber, Taby (SE)

(73) Assignee: Telia Company AB

( * ) Notice: Subject to any disclaimer, the term of this patent is extended or adjusted under 35 U.S.C. 154(b) by 0 days.

(21) Appl. No.: 16/581,951

(22) Filed: Sep. 25, 2019

(65) Prior Publication Data

US 2020/0107192 A1 Apr. 2, 2020

(30) Foreign Application Priority Data

Sep. 28, 2018 (SE) .................................. 1851167-5

(51) Int. Cl.
| | | |
|---|---|---|
| H04W 4/00 | (2018.01) | |
| H04W 12/06 | (2021.01) | |
| H04B 17/318 | (2015.01) | |
| H04L 12/46 | (2006.01) | |
| H04W 24/10 | (2009.01) | |
| H04W 64/00 | (2009.01) | |
| H04W 84/12 | (2009.01) | |

(52) U.S. Cl.
CPC .......... *H04W 12/06* (2013.01); *H04B 17/318* (2015.01); *H04L 12/4641* (2013.01); *H04W 24/10* (2013.01); *H04W 64/00* (2013.01); *H04W 84/12* (2013.01)

(58) Field of Classification Search
CPC ..... H04W 12/06; H04W 24/10; H04W 64/00; H04W 84/12; H04W 12/00503; H04W 4/021; H04W 4/02; H04B 17/318; H04L 12/4641; H04L 12/4679; H04L 63/107
USPC ........................................................ 370/329
See application file for complete search history.

(56) References Cited

U.S. PATENT DOCUMENTS

| | | | | |
|---|---|---|---|---|
| 2008/0148359 | A1* | 6/2008 | Kezys ................... | H04W 12/08 726/4 |
| 2015/0134851 | A1* | 5/2015 | Relan ..................... | H04L 45/126 709/241 |
| 2017/0245211 | A1* | 8/2017 | Patil ................... | H04W 52/0206 |
| 2019/0013968 | A1* | 1/2019 | Xie ........................ | H04L 63/102 |

FOREIGN PATENT DOCUMENTS

| | | |
|---|---|---|
| EP | 1555778 A1 | 7/2005 |
| EP | 1 720 370 A1 | 11/2006 |
| WO | WO 2013/055421 A1 | 4/2013 |

OTHER PUBLICATIONS

Search Report, Application No. 1851167-5, dated May 9, 2019, Swedish Patent and Registration Office, Stockholm, Sweden.

(Continued)

*Primary Examiner* — Mang Hang Yeung
(74) *Attorney, Agent, or Firm* — Burr & Forman LLP; Jeffrey H. Kamenetsky

(57) ABSTRACT

The embodiments herein relate to a method and a network device for providing services to user devices in a wireless network. The method comprises authenticating a user device to an Access Point of a WLAN or WiFi network; determining, by a network device, a location of the user device; assigning a VLAN to the user device based on the location of the user device; and providing at least one service available via the assigned VLAN network.

7 Claims, 4 Drawing Sheets

(56) References Cited

OTHER PUBLICATIONS

Search Report, Application No. 19196723.1-1213, dated Feb. 13, 2020, European Patent Office, Munich, Germany.
Communication Pursuant to Article 94(3) EPC, dated Jan. 25, 2021, European Patent Office, Netherlands.
Erten Y. M. Et al.: "A Layered Security Architecture for Corporate 802.11 Wireless Networks", Wireless Telecommunications Symposium, 2004 Pomona, CA, USA, May 14-15, 2004, Piscataway, NJ, USA, IEEE, May 14, 2004, pp. 123-128.

* cited by examiner

METHOD AND A NETWORK DEVICE FOR PROVIDING SERVICES TO USER DEVICES IN A WIRELESS NETWORK

TECHNICAL FIELD

The present disclosure relates to the field of wireless communications, and in particular to a method and a network device for providing location-based services to wireless devices based on the VLAN technology.

BACKGROUND

WiFi or WLAN is getting more and more common and is a very popular access network which is virtually available almost all over the globe. In 99.9% of today's WLAN installation, the system works the same, i.e., a user logs in and has the same access everywhere. This provides some security risks, e.g., eavesdropping or even stealing user IDs such as pin code, passwords, etc. Other solutions have at least divided the users or user devices in different groups with different access right(s), Dynamic Virtual Local Area Network (VLAN).

SUMMARY

It is an object of embodiments herein to solve at least the above-mentioned problems by providing a method and a network device for providing at least one service available via an assigned VLAN network as disclosed in main claim 1 covering a method claim and in claim 7 covering a network device claim. Additional advantages of the embodiments are further disclosed in dependent claims 2-6 concerning method claim 1 and in dependent claims 8-11 concerning apparatus claim 7.

According to an aspect of embodiments herein, there is provided a method comprising: authenticating a user device to an access point of a Wireless Local Area Network, WLAN or WiFi network; determining, by a network device, a location of the user device; assigning a Virtual Local Area Network, VLAN, to the user device based on the location of the user device; and providing at least one service available via the assigned VLAN network.

According to another aspect of embodiments herein there is provided a network node comprising a memory, a hardware processor executing instructions from the memory to: authenticate a user device to an access point of a Wireless Local Area Network, WLAN, or WiFi network, determine a location of the user device; assign a Virtual Local Area Network, VLAN, to the user device based on the location of the user device; and provide at least one service available via the assigned VLAN network.

An advantage with the embodiments herein is to let the network be aware of where a wireless device or a client is located to allow usage of different types of services.

Another advantage is to lock different services to different areas, by assigning different VLANs to coordinates in a coverage map wherein the wireless devices are located. Dynamic VLAN assigned by coordinates from connected devices.

DETAILED DESCRIPTION

In the following, a detailed description of the exemplary embodiments is described in conjunction with the drawings, in several scenarios to enable easier understanding of the solution(s) described herein.

In general, the embodiments of the present disclosure suggest that different services should be locked to different areas.

The simplest wat to implement this may be to check the signal strength of the client/wireless device as received by the network device in order to determine proximity of the client. Herein, the terms client and wireless device (or User Equipment) are used interchangeably.

Figure 1:
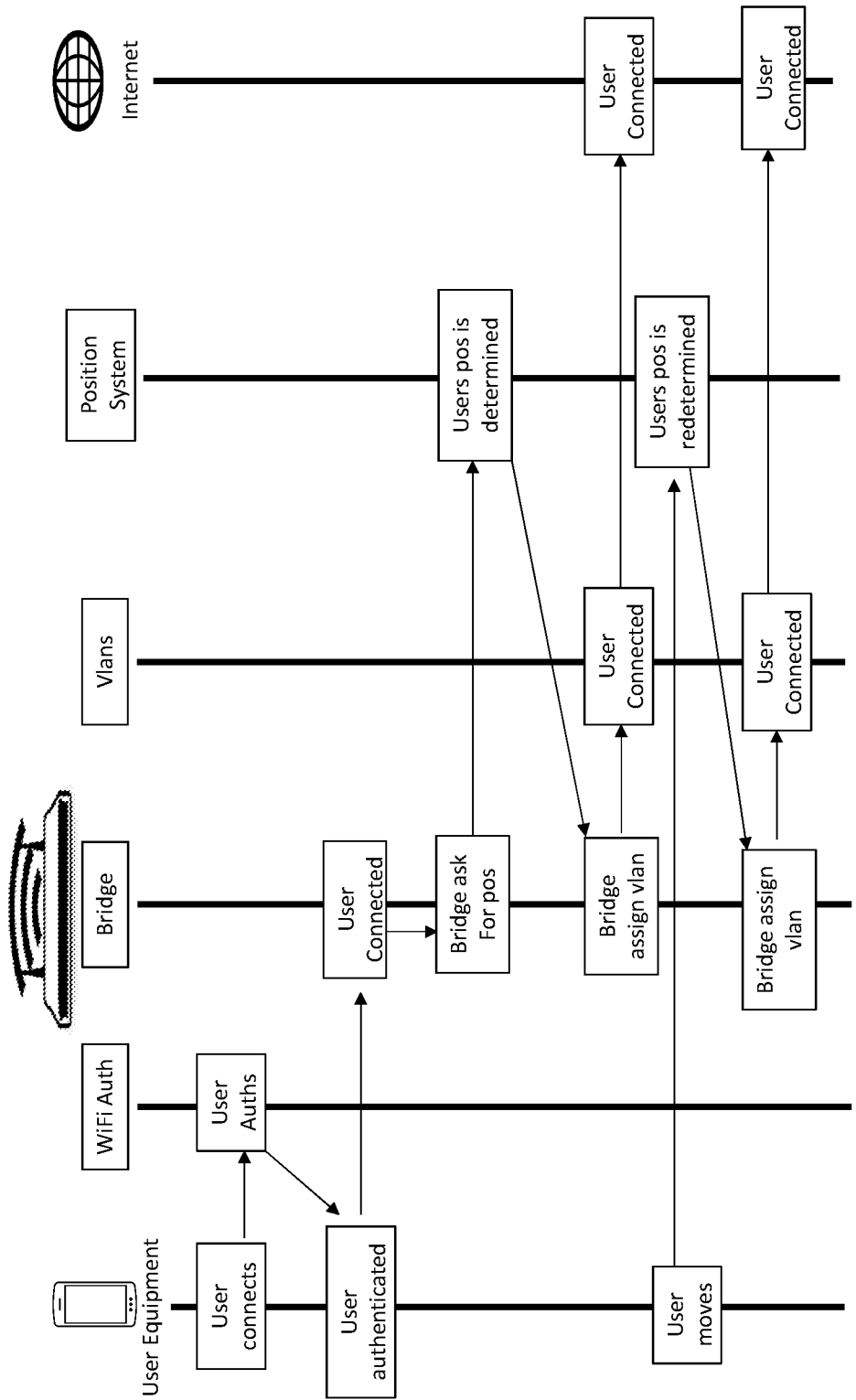
FIG. 1 shows a basic signaling flow scenario involving different entities.

FIG. 1 shows as example scenario involving a UE or wireless device, a WiFi Authentication function (WiFi Auth), a bridge, one or more VLANs, a positioning system residing in a network device, and the Internet.

A UE or user device connects to a WiFi service after authentication and after authentication, the system or network device determines the location/coordinates of the UE. The location or position may be determined based on the signal strength received by the network device or positioning system. Any method for determining a location of a UE may be used. Hence the embodiments herein are not restricted to any specific method for determining a position of a UE.

In case of a big or large network instead of a WiFi network, the location of the of the user may be determined by creating a 3-dimensional (3D) map wherein different VLANs may be assigned to different physical areas.

Based on the location of the UE, the network device or system assigns a VLAN to the UE. Different VLANs provide different area-based services to UEs, or location-based devices to the UEs.

As an example, one may map out an area by 3+ coordinates by going/walking around with a mobile application. The name of the area wherein the UE is walking is given. Example: "livingroom". Then, one goes to a network configuration and assigns a network VLAN to this area. Example: "10.0.10.1/255". Note that automatic or manual configuration may be used. Then one goes to the service part of an administration (admin.) portal and assigns services per network. Example "livingroom"→"free netflix". After user authentication, one may assign a WiFi-capable terminal or UE to a selected VLAN based on user position data determined by the system, and services specific to this VLAN area are offered.

It should be mentioned that even the access may be viewed or counted as a service, since different VLANs might have different access rights. As an example, one may be allowed to access and change network configurations from the IT department premises.

As a non-limiting example, in hospitals, the doctors in the room (VLAN area) and not in the waiting room may only access patient journals.

As another non-limiting example, in an office meeting room, email-applications or email programs are turned off, while access to the presentation in the room is allowed.

In another non-limiting example, in a house, video streaming is only allowed in the living room and is prioritized vs other types of traffic, service.

FIG. 1 is self-explanatory with respect to the different entities involved.

Figure 2:
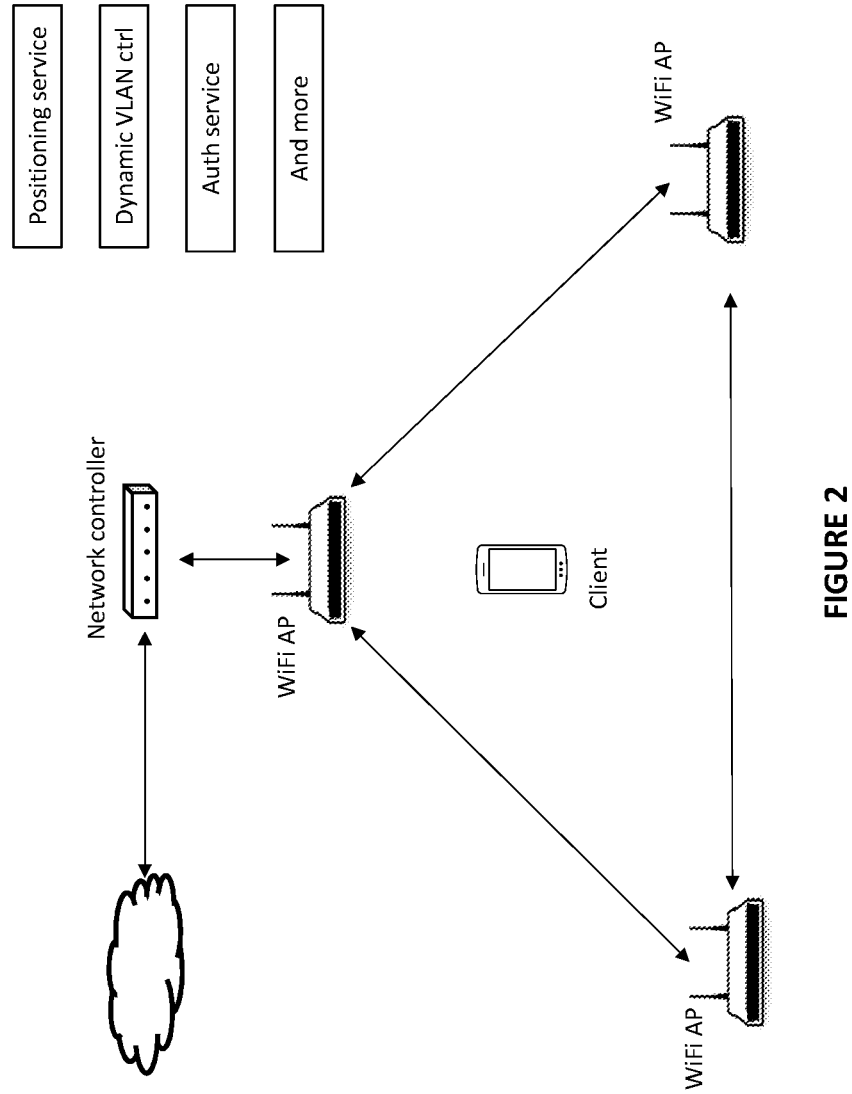
FIG. 2 depicts another scenario wherein embodiments herein may be applied.

FIG. 2 shows another scenario wherein embodiments herein may be applied. The network may comprise several WiFi Access Points (APs). The APs may be connected in the backend to a positioning service or positioning system or network device as previously mentioned, which may tag each incoming (authentication) message with a set of 3D coordinates. One or more APs may be connected to the network or network controller and/or use, e.g., the signal strength or messages or signals received from a client or may use triangulation or a GPS method or any positioning method for determining the location of the user device or client.

The Auth service operates as a normal Auth service, except it has a 3D map of the area covered, which contains 3D coordinates mapping virtual rooms that in their way are also mapped to different virtual networks.

The network has different service rules attached just as in normal cases of VLANs. Hence, when, e.g., an Auth request (or any other message) is sent/received (or periodically checked if coordinates changes), the positioning system or network device checks the coordinates and informs the Auth service of the 3D coordinates, and then one or several VLANs is/are dynamically assigned to the client or user device.

It should be noted that the network controller may comprise several sub-systems, such as an Auth service, and dynamic VLAN services and possibly even a positioning system. Hence, the network controller may include any of the blocks shown in FIG. 2. Further, any WiFi AP may include the network controller.

Figure 3:
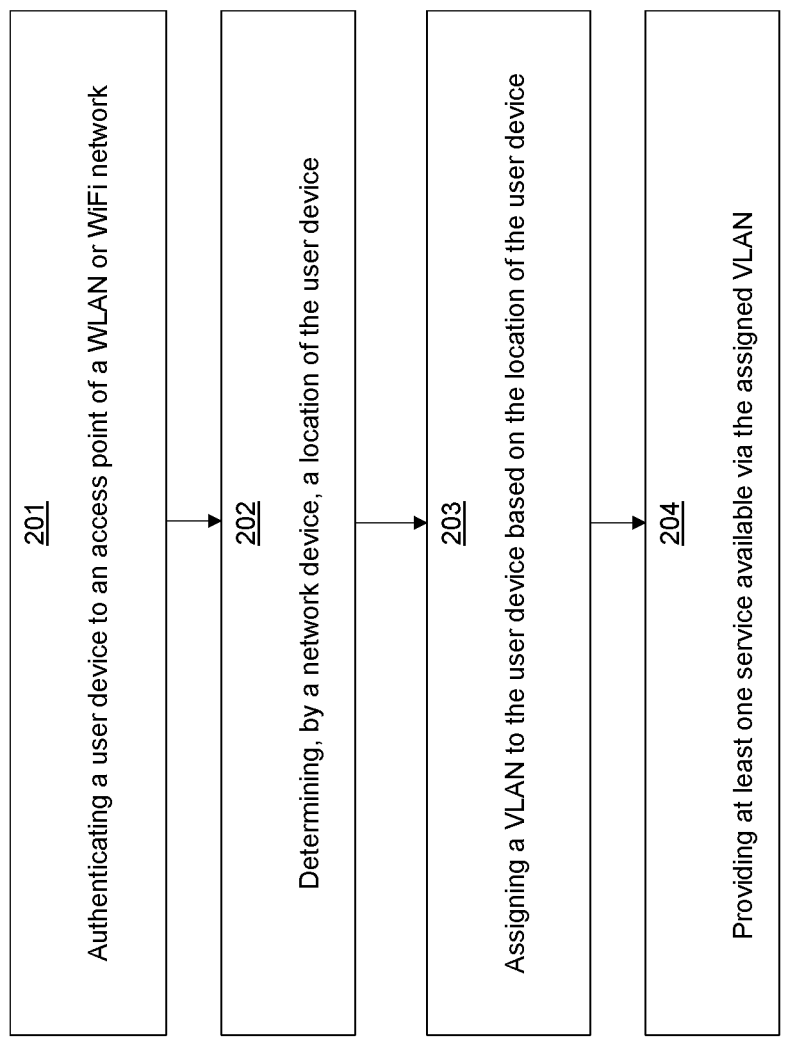
FIG. 3 illustrates a flowchart of a method performed by a network device according to embodiments herein.

Referring to FIG. 3 there is illustrated the steps of the method according to embodiments herein for providing services to user devices.

The Method Comprises:

(S201) authenticating a user device to an access point of a Wireless Local Area Network, WLAN;

(S202) determining, by a network device, a location of the user device;

(S203) assigning a Virtual Local Area Network, network to the user device based on the location of the user device; and (S204) providing at least one service available via the assigned VLAN network.

According to an exemplary embodiment, determining a location of the user device is determined based on a signal strength measured by the network device. According to another exemplary embodiment, determining a location of the user device is determined based on a 3D map of an area wherein the user device is located.

According to an exemplary embodiment, authenticating the user device comprises receiving an authentication message from the user device and connecting to the access point or AP after successful authentication.

According to an exemplary embodiment, the method further comprises tagging each incoming authentication message with a set of 3D coordinates representing the location of the user device. The steps S201-S204 above are repeated when the user of the user device moves to another location of e.g. another VLAN.

Figure 4:
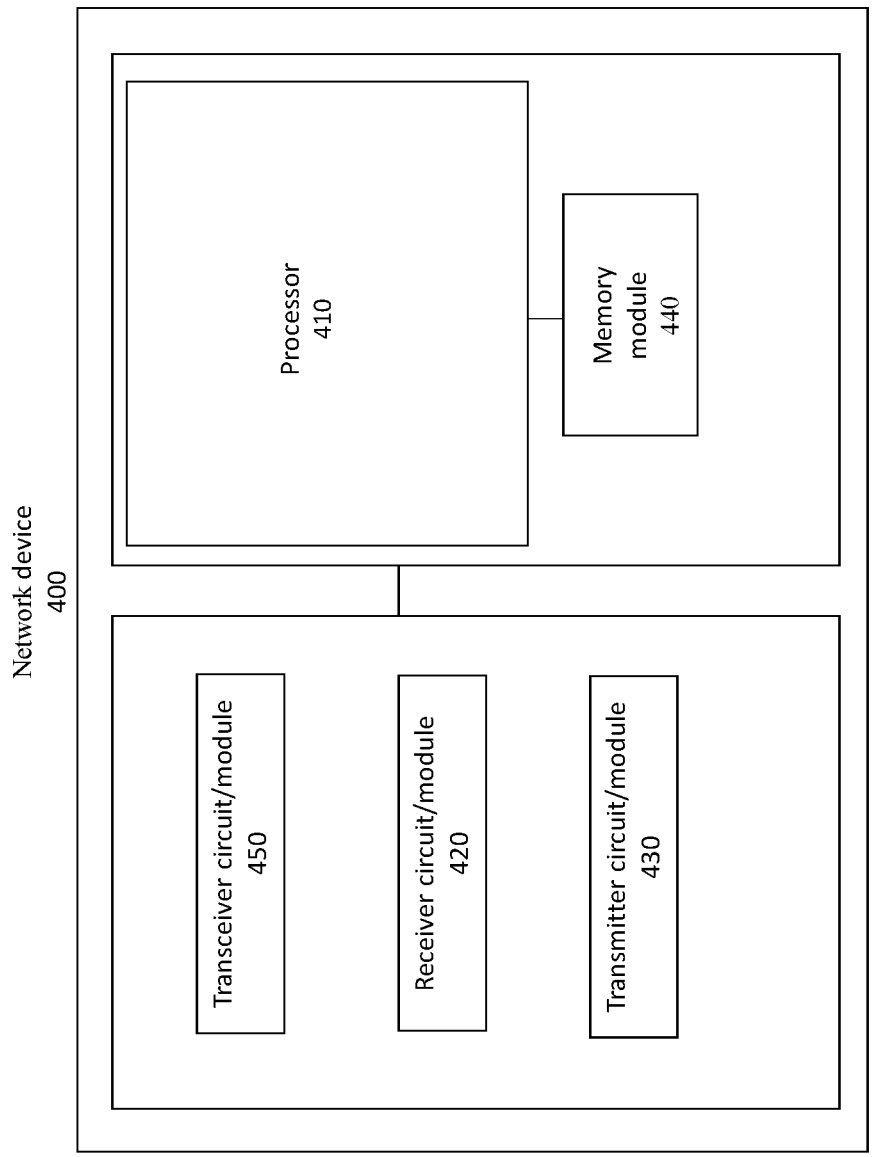
FIG. 4 illustrates an exemplary block diagram depicting a network device according to embodiments herein.

To perform the method or procedure steps/actions described above, a network device is provided as exemplified in FIG. 4. The network device 400 comprises a processing circuit 410, a processing module, or a hardware processor, antenna circuitry (not shown); a receiver circuit 420 or receiver module; a transmitter circuit 430 or transmitter module; a memory module 440 or memory and a transceiver circuit 450 or transceiver module, which may include the transmitter circuit 430 and the receiver circuit 420. The network device 400 may include additional components not shown in FIG. 4.

The network device 400 comprising the memory 440 and the hardware processor 410 for executing instructions from the memory 440 to: determine a location of a user device; assign a VLAN, to the user device based on the location of the user device; and provide at least one service available via the assigned VLAN network. Note that assigning a VLAN may be performed using a network ID of the VLAN or any other suitable method.

The network device 400 may be operative to authenticate a user device to an access point of a Wireless Local Area Network, WLAN, or WiFi network, and determine the location of the user device based on a signal strength measured by the network device 400. The network device 400 accordingly may be operative to determine the location of the user device based on a 3D map of an area wherein the user device is located.

Authenticating the user device comprises receiving an authentication message from the user device and connecting to the access point after successful authentication. The network device 400 may further tag each incoming authentication message with a set of three-dimensional coordinates representing the location of the user device.

There is also provided a computer program comprising instructions which when executed on at least one processor of the network device 400 according to anyone of claims 7-11, cause the processor to carry out the method according to anyone claims 1-6.

As clear from the description of the embodiments herein, an advantage with the invention is to let the network be aware of where a wireless device or a client or a user device is located to allow usage of different types of services.

Another advantage is to lock different services to different areas, by assigning different VLANs to coordinates in a coverage (3D) map wherein the wireless devices or clients or user devices are located. Dynamic VLAN assigned by coordinates from connected user devices.

Throughout this disclosure, the word "comprise" or "comprising" has been used in a non-limiting sense, i.e. meaning, "consist at least of". Although specific terms may be employed herein, they are used in a generic and descriptive sense only and not for purposes of limitation. The embodiments herein may be applied in any wireless system including GSM, LTE-A (or LTE-Advanced), 5G, UMTS, WiMAX and WiFi.

The invention claimed is:

1. A method comprising:

authenticating a user device to an access point of a Wireless Local Area Network, WLAN or WiFi network, the authentication comprising receiving an authentication message from the user device and connecting to the access point after successful authentication;

determining, by a network device, a location of the user device;

assigning a Virtual Local Area Network, VLAN, to the user device based on the location of the user device;

providing at least one service available via the assigned VLAN network, wherein the assigned VLAN is one of different VLANs capable of providing different area-based services to user devices; and tagging each incoming authentication message with a set of three-dimensional coordinates representing the location of the user device.

2. The method according to claim 1, wherein determining a location of the user device is based on a signal strength measured by the network device.

3. The method according to claim 1, wherein determining a location of the user device is based on a three-dimensional map of an area wherein the user device is located.

4. The method according to claim 1, further comprising repeating the steps of claim 1 responsive to determining that the user of the user device moves to another location.

5. A network device comprising:
a memory; and
a hardware processor executing instructions from the memory to:
authenticate a user device to an access point of a Wireless Local Area Network, WLAN, or WiFi network, the authentication comprising receiving an authentication message from the user device and connecting to the access point after successful authentication;
determine a location of the user device;
assign a Virtual Local Area Network, VLAN, to the user device based on the location of the user device;
provide at least one service available via the assigned VLAN network, wherein the assigned VLAN is one of different VLANs capable of providing different area-based services to user devices; and
tag each incoming authentication message with a set of three-dimensional coordinates representing the location of the user device.

6. The network device according to claim 5, wherein the processor is further operative to determine the location of the user device based on a signal strength measured by the network device.

7. The network device according to claim 5, wherein the processor is further operative to determine the location of the user device based on a three-dimensional map of an area wherein the user device is located.

* * * * *